Patented Sept. 16, 1947

2,427,534

UNITED STATES PATENT OFFICE 2,427,534

PYRAZOLONE DISAZO DYESTUFFS

Peter Pieth, Basel, Switzerland, assignor to Society of Chemical Industry in Basle, Basel, Switzerland, a Swiss firm.

No Drawing. Application April 4, 1945, Serial No. 586,633. In Switzerland May 17, 1944

18 Claims. (Cl. 260—160)

The present invention is concerned with azo-dyestuffs capable of forming complex metal compounds. More particularly the present invention relates to substantive azo-dyestuffs which on coppering yield dyeings of good fastness especially to light and acids.

It has already been proposed to make azo-dyestuffs with 4:4′-diaminodiphenylurea-3:3′-dicarboxylic acid, cf. for example U. S. Patent No. 1,560,949, by using as coupling components for example 1-(3′-aminophenyl)-3-methyl-5-pyrazolone, 1-phenyl-3-carboxy-5-pyrazolone, acetoacetic anisidine or acetoacetic anilide-para-carboxylic acid. The dyestuffs of the present invention possess considerably improved properties as compared with those of U. S. Patent No. 1,560,949, particularly better fastness to light.

According to the present invention valuable azo-dyestuffs are made by coupling tetrazotized 4:4′-diaminodiphenylurea-3:3′-dicarboxylic acids with arylpyrazolones containing a sulfamide group.

Among the tetrazo components used as starting materials for the present process special reference is made to the 4:4′-diamino-diphenylurea-3:3′-dicarboxylic acid of the formula

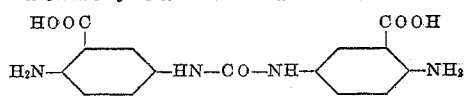

which is free from further substituents. The tetrazotization can be effected in usual manner. As coupling components for the present process there can be used above all 1-phenyl-pyrazolones, the phenyl redical of which is substituted by a sulfamide group. In these pyrazolones the phenyl radical can be free from further substituents apart from the sulfamide group. The 3-position of the pyrazolone radical can be occupied in usual manner, for example, by a methyl group. As coupling components there are especially to be mentioned 1-(sulfamidophenyl)-3-methyl-5-pyrazolones, the sulfamide group of which occupies the 3′- or 4′-position.

Coupling of the above mentioned tetrazo compounds with the indicated coupling components of which two mols of the same component or one mol each of two different components can be used, is effected if desired in an acid medium, preferably however in a neutral medium or advantageously in an alkaline medium.

In many cases the same dyestuffs can be obtained according to a modified process by coupling diazotized 2-aminobenzene-1-carboxylic acids containing in 5-position a group convertible into an amino group, with arylpyrazolones containing a sulfamide group, converting the substituent in 5-position of the diazo component into an amino group and then condensing 2 mols of an aminoazo compound thus obtained to form urea. The 2-aminobenzene-1-carboxylic acids used as starting materials for this process may contain in 5-position for example a nitro group or an amino group which is suitably protected, for example by acylation. The conversion of the substituent in 5-position is then effected in known manner, for example, by reduction in the case of the nitro group and by saponification in the case of the acylamino group. The condensation to urea is effected preferably by treatment with phosgene according to known methods. The manufacture of unsymmetrical dyestuffs is also possible according to this process.

The sulfamide group can be substituted in known manner and contain as N-substituents for example alkyl, hydroxyalkyl or other groups.

The dyestuffs obtained according to the present process are suitable for dyeing various materials, such as leather, wool, superpolyamide fibers, plastic masses, gelatine, and the like, especially however for dyeing and printing cellulosic fibers, such as linen, cotton, rayon, and staple fiber from regenerated cellulose.

Particularly valuable results are obtained by treating the dyestuffs in substance, in the dye-bath or on the fiber with agents yielding metal, for example, chromium, cobalt, and especially copper. The metallization in substance can be performed according to known methods in an alkaline, neutral or acid medium, with or without the addition of agents promoting the formation of a complex or increasing the solubility. In many cases the treatment is carried out with agents yielding metal, especially agents yielding copper, preferably on the fiber or in a one-bath process partly in the dye-bath and partly on the fiber, as described for example in U. S. Patent No. 2,148,659.

The present process permits the manufacture of dyestuffs which produce on cellulose fibers yellow to brown-orange shades of especially good fastness to light and good fastness to washing and to acid.

The following examples illustrate the invention, the parts being by weight:

Example 1

6.6 parts of 4:4′-diaminodiphenylurea-3:3′-dicarboxylic acid as sodium salt are dissolved in 200 parts of water, mixed with 2.8 parts of sodium nitrite and poured into ice and 14 parts of hydrochloric acid of 30 per cent. strength, while stirring. The suspension of the diazo compound is stirred for some time and then coupled with a solution alkaline with sodium carbonate of 10.2 parts of 1-(3'-sulfamidophenyl)-3-methyl-5-pyrazolone. When coupling is complete the dyestuff is filtered and dried. It is a red-brown powder of the probable formula

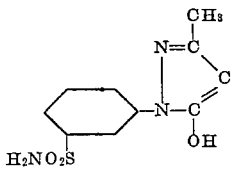

dissolving with a yellow coloration in dilute sodium carbonate solution and in concentrated sulfuric acid, and dyeing cotton brown-yellow tints which are fast to washing and to light according to the one-bath or two-baths after-coppering process.

A similar dyestuff is obtained by using 1-(4'-sulfamido-phenyl)-3-methyl-5-pyrazolone as coupling component or by coupling the said tetrazo component first with 1 mol of 1-(3'-sulfamido-phenyl)3-methyl-5-pyrazolone and then with 1 mol of 1-(4'-sulfamidophenyl)-3-methyl-5-pyrazolone.

*Example 2*

3.6 parts of 5-nitro-2-aminobenzoic acid are diazotized in usual manner and coupled in a solution alkaline with sodium carbonate with 5.1 parts of 1-(3'-sulfamidophenyl)-3-methyl-5-pyrazolone. When coupling is complete the dyestuff is filtered, stirred into 100 parts of water, and after addition of a solution of sodium sulfide containing 9.6 parts of crystallized sodium sulfide the whole is stirred for some hours at 60-65° C. It is neutralized with dilute hydrochloric acid and the precipitated aminoazo-dyestuff is filtered. This is converted in known manner into the urea derivative by treating with phosgene. The dyestuff is identical with that described in the first paragraph of Example 1.

*Example 3*

100 parts of cotton are entered at 50° C. into a dye bath containing 4000 parts of water, 2 parts of sodium carbonate and 1 part of the dyestuff obtained according to Example 2. The temperature is slowly raised to boiling point, 30 parts of Glauber's salt are added, and dyeing is conducted for ¾ hour at 95-100° C. The dye bath is then cooled to about 70° C., 1 part of complex copper sodium tartrate having about a neutral reaction is added, and coppering is carried on at about 80° C. for ½ hour whereupon the material is thoroughly rinsed with cold water. The resulting brown-yellow dyeing can be saponified, if desired.

What I claim is:

1. An azo-dyestuff of the general formula

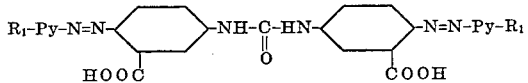

wherein each Py stands for a pyrazolone radical and each $R_1$ for a phenyl radical carrying a sulfonamide group.

2. An azo-dyestuff of the general formula

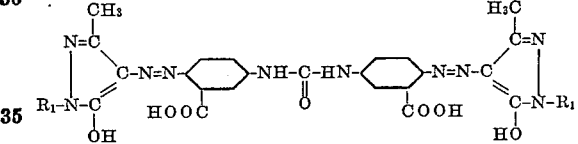

wherein each $R_1$ stands for a phenyl radical carrying a sulfonamide group.

3. An azo-dyestuff of the general formula

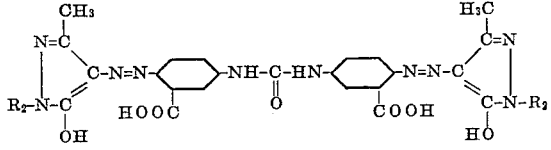

wherein both $R_2$'s stand for radicals of the benzene series carrying a sulfonamide group but being free from further substituents.

4. The azo-dyestuff of the formula

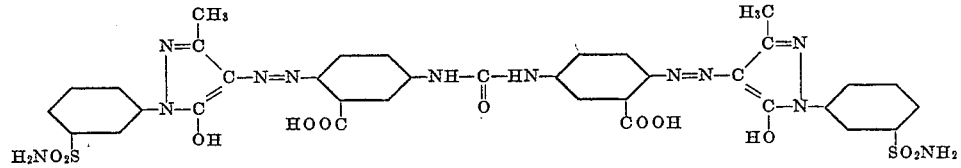

5. The azo-dyestuff of the formula

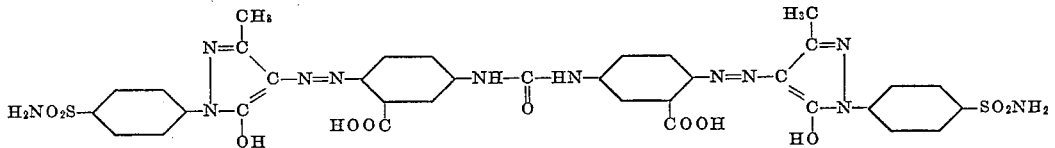

6. The azo-dyestuff of the formula

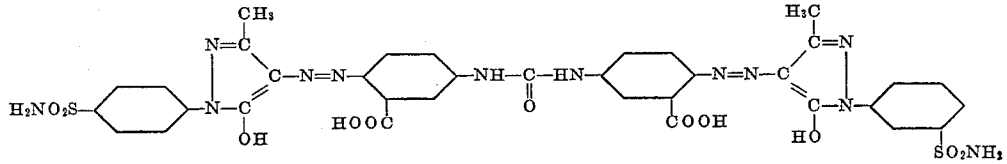

7. Process for the manufacture of an azo-dyestuff which comprises uniting tetrazotized 4:4′-diaminodiphenyl-urea-3:3′-dicarboxylic acid with a 1-phenyl-pyrazolone containing a sulfonamide group on the phenyl radical.

8. Process for the manufacture of an azo-dyestuff which comprises uniting tetrazotized 4:4′-diaminodiphenyl - urea - 3:3′ - dicarboxylic acid with a 1-phenyl-3-methyl-5-pyrazolone carrying a sulfonamide group in the phenyl radical.

9. Process for the manufacture of an azo-dyestuff which comprises uniting tetrazotized 4:4′-diaminodiphenyl - urea - 3:3′ - dicarboxylic acid with one molecular proportion of 1-(3′-sulfonamidophenyl)-3-methyl-5-pyrazolone and one molecular proportion of 1-(4′-sulfonamidophenyl)-3-methyl-5-pyrazolone.

10. Process for the manufacture of an azo dyestuff which comprises uniting tetrazotized 4:4′-diaminodiphenyl - urea - 3:3′ - dicarboxylic acid with 1 - (3′-sulfonamidophenyl)-3-methyl-5-pyrazolone.

11. Process for the manufacture of an azo-dyestuff which comprises uniting tetrazotized 4:4′-diaminodiphenyl - urea - 3:3′ - dicarboxylic acid with 1 - (4′-sulfonamidophenyl)-3-methyl-5-pyrazolone.

12. Process for the manufacture of an azo-dyestuff, which comprises uniting diazotized 2-aminobenzene-1-carboxylic acid which contains in 5-position a group capable of conversion into the amino group with a 1-phenyl-pyrazolone containing a sulfonamide group on the phenyl radical, transforming the substituent in 5-position into an amino group and reacting the said amino-azo-dyestuff with agents capable of forming an urea bond.

13. Process for the manufacture of an azo-dyestuff, which comprises uniting diazotized 2-aminobenzene-1-carboxylic acid which contains in 5-position a group capable of conversion into the amino group with a 1-phenyl-pyrazolone containing a sulfonamide group on the phenyl radical, transforming the substituent in 5-position into an amino group and reacting the said amino-azo-dyestuff with phosgene.

14. Process for the manufacture of an azo-dyestuff, which comprises uniting diazotized 2-aminobenzene-1-carboxylic acid which contains in 5-position a group capable of conversion into the amino group with a 1-phenyl-3-methyl-5-pyrazolone carrying a sulfonamide group in the phenyl radical, transforming the substituent in 5-position into an amino group and reacting the said aminoazo-dyestuff with phosgene.

15. Process for the manufacture of an azo-dyestuff, which comprises uniting diazotized 2-aminobenzene-1-carboxylic acid which contains in 5-position a group capable of conversion into the amino group with a 1-phenyl-3-methyl-5-pyrazolone the phenyl radical carrying a sulfonamide group but being free from further substituents, transforming the substituent in 5-position into an amino group and reacting the said aminoazo-dyestuff with phosgene.

16. Process for the manufacture of an azo-dyestuff, which comprises uniting diazotized 2-aminobenzene-1-carboxylic acid which contains in a 5-position a group capable of conversion into the amino group with 1-(3′-sulfonamidophenyl)-3-methyl-5-pyrazolone, transforming the substituent in 5-position into an amino group and reacting the said amino-azo-dyestuff with phosgene.

17. Process for the manufacture of an azo-dyestuff, which comprises uniting diazotized 2-aminobenzene-1-carboxylic acid which contains in 5-position a group capable of conversion into the amino group with 1-(4′sulfonamidophenyl)-3-methyl-5-pyrazolone, transforming the substituent in 5-position into an amino group and reacting the said amino-azo-dyestuff with phosgene.

18. Process for the manufacture of an azo-dyestuff, which comprises reacting a mixture of the dyestuffs of the formula

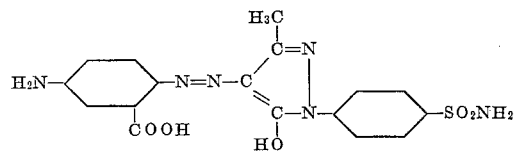

and

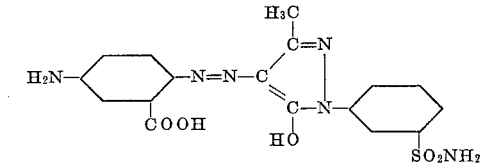

with phosgene.

PETER PIETH.

REFERENCES CITED

The following references are of record in the file of this patent:

UNITED STATES PATENTS

| Number | Name | Date |
| --- | --- | --- |
| 1,560,949 | Stusser | Nov. 10, 1925 |
| 1,753,120 | Kammerer | Apr. 1, 1930 |
| 2,194,857 | Krzikalla et al. | Mar. 26, 1940 |

Certificate of Correction

Patent No. 2,427,534. September 16, 1947.

PETER PIETH

It is hereby certified that errors appear in the printed specification of the above numbered patent requiring correction as follows: Column 1, line 35, for "redical" read *radical*; column 3, line 28, for "phenyl)3–" read *phenyl)-3-*; column 4, lines 47 and 48, claim 3, for "both R₂'s stand for radicals of the benzene series" read *each $R_2$ stands for a phenyl radical*; column 6, line 22, claim 17, for "(4'sulfonamidophenyl)" read *(4'-sulfonamidophenyl)*; and that the said Letters Patent should be read with these corrections therein that the same may conform to the record of the case in the Patent Office.

Signed and sealed this 4th day of November, A. D. 1947.

[SEAL]

THOMAS F. MURPHY,
*Assistant Commissioner of Patents.*